United States Patent
Cometti et al.

[15] 3,696,103
[45] Oct. 3, 1972

[54] AZABOROLIDINE COMPOUNDS

[72] Inventors: Andrew Cometti, Maisons-Alfort; Jean Fouche, Bourg-la-Reine; Yves Le Goff, Bretigny-sur-Orge, all of France

[73] Assignee: Rhone-Poulenc S.A., Paris, France

[22] Filed: Feb. 2, 1970

[21] Appl. No.: 8,034

[30] Foreign Application Priority Data

Feb. 3, 1969 France.....................6902292

[52] U.S. Cl.............260/268 R, 260/247, 260/247.1, 260/247.7, 260/293.65, 260/326.84, 260/326.85, 260/551 B, 260/556 AR, 424/185, 71/88, 71/94, 71/95, 71/98, 71/118
[51] Int. Cl............................................C07d 107/02
[58] Field of Search...260/556, 551, 268, 293, 293.4, 260/294.7, 247, 247.1, 247.7, 326.5, 326.8, 326.84

[56] References Cited

UNITED STATES PATENTS 3,201,464  8/1965  Brown et al. .............260/551

Primary Examiner—Henry R. Jiles
Assistant Examiner—Harry I. Moatz
Attorney—Stevens, Davis, Miller & Mosher

[57] ABSTRACT

The new azaborolidine compounds of the formula:

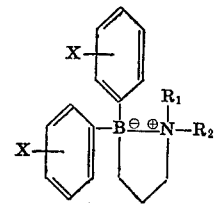

wherein $R_1$ and $R_2$ represent alkyl of one through four carbon atoms, or $R_1$ and $R_2$ together with the nitrogen atom collectively represent a mononuclear 5- or 6-membered heterocyclic group, X represents hydrogen, halogen, alkyl, alkoxy or alkylthio of one through four carbon atoms, or trifluoromethyl or dimethyl-sulphamoyl, and at least one of the carbon atoms of the trimethylene chain linking the nitrogen and boron atoms can be substituted by alkyl of one through four carbon atoms, possess fungicidal, insecticidal acaricidal and herbicidal properties.

16 Claims, No Drawings

AZABOROLIDINE COMPOUNDS

This invention relates to new boron derivatives, to a process for their preparation, and compositions containing them.

The new boron derivatives of the present invention are those of the general formula:

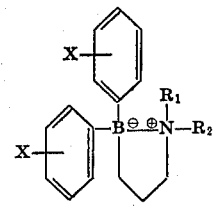

I wherein $R_1$ and $R_2$ represent alkyl radicals containing one to four carbon atoms, which may be the same or different, or $R_1$ and $R_2$ together with the nitrogen atom to which they are attached collectively represent a mononuclear 5- or 6- membered heterocyclic group, which may contain a second hetero atom selected from nitrogen, oxygen and sulphur, such as 1-pyrrolidinyl, piperidino, morpholino or a 4-alkyl-1-piperazinyl group, X represents a hydrogen or halogen atom, an alkyl, alkoxy or alkylthio radical containing one to four carbon atoms, or a trifluoromethyl or dimethylsulphamoyl radical, and one or more of the carbon atoms of the trimethylene chain linking the nitrogen and boron atoms in the azaborolidine ring can be substituted by at least one alkyl radical containing one to four carbon atoms, e.g. the chain can be $-CH_2-CH(CH_3)-CH_2-$.

According to a feature of the invention, the boron derivatives of general formula I are prepared by reaction of a diphenylboron compound of the general formula:

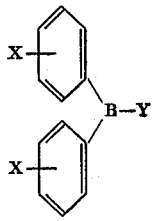

II (wherein X is as hereinbefore defined, and Y represents a halogen (preferably chlorine) atom, an alkoxy radical e.g. butoxy, or a 2-aminoethoxy or 2-dimethylaminoethoxy radical) with an organomagnesium compound, preferably prepared in situ, of the general formula:

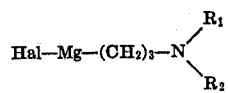

III wherein $R_1$ and $R_2$ are as hereinbefore defined, Hal represents a halogen atom, and one or more of the carbon atoms of the trimethylene chain can be substituted by at least one alkyl radical containing one to four carbon atoms.

When Y in general formula II represents a 2-aminoethoxy or 2-dimethylaminoethoxy radical the reactant can be written in the cyclic form:

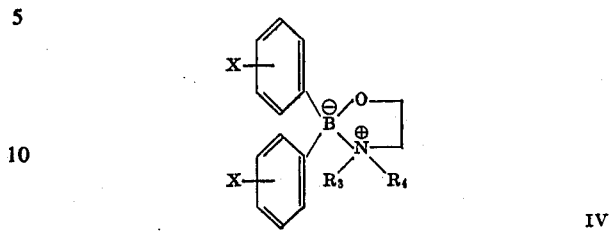

IV wherein $R_3$ and $R_4$ are the same and represent hydrogen atoms or methyl radicals.

The reaction is carried out in an inert organic solvent, for example diethyl ether or tetrahydrofuran, at a temperature between 0° C. and the boiling point of the reaction mixture, and is followed by hydrolysis of the organometal reaction product using conditions known per se, e.g. with aqueous ammonium chloride or hydrochloric acid. The boron derivatives of general formula I thus obtained can optionally be purified by physical methods such as crystallization or chromatography.

The starting materials of general formula II wherein Y represents a halogen atom can be obtained, for example, according to the method indicated by J. Soulie and P. Cadiot, Bull. Soc. Chim., p. 1981 (1966). The starting materials of general formula II wherein Y represents a 2-aminoethoxy or 2-dimethylaminoethoxy radical [i.e. the 1,3,2-oxazaborolidine compounds of general formula IV] or an alkoxy radical can be obtained, for example, according to the methods described by Y. Rasiel and H.K. Zimmerman Jr., Ann. *649*, 111 (1961) or by R.L. Letsinger and I. Skoog, J. Am. Chem. Soc., 77, 2491 (1955).

The new boron derivatives of general formula I possess interesting fungicidal, insecticidal, acaricidal and herbicidal properties.

The fungicidal activity is polyvalent and is shown against bean anthracnose (*Colletrotrichum lindemuthianum*), tomato mildew (*Phytophthora infestans*), tobacco mildew (*Peronospora tabaci*), cucumber mildew (*Erysiphe cichoracearum*) and wheat rust (*Puccinia glumarum*) at quantities of between 10 and 200 g. of active substance per hectoliter of liquid diluent such as water.

The insecticidal activity is shown, more particularly by contact, against *diptera* (*Musca domestica*), *coleoptera* (*Tribolium confusum*) and *lepidoptera* (caterpillars such as *Plutella maculipennis*) at quantities of between 10 and 100 g. of active substance per hectoliter of liquid diluent.

The acaricidal activity, which is combined with good persistence, is of value against phytophagic acarids (*Tetranychus telarius*) at quantities of between 10 and 100 g. of active substance per hectoliter of liquid diluent. At quantities of between 50 and 200 g. of active substance per hectoliter, a considerable ovicidal activity is exhibited.

The herbicidal activity is shown more particularly by pre-emergence application against gramineal (foxtail) at quantities of between 0.5 and 5 kg. of active substance per hectare.

Preferred boron derivatives of general formula I are those wherein X represents a hydrogen or halogen (e.g. chlorine or fluorine) atom, or an alkyl (e.g. methyl or butyl), alkoxy (e.g. methoxy) or alkylthio (e.g. methylthio) radical; more particularly those wherein $R_1$ and $R_2$ represent methyl radicals, or $R_1$ and $R_2$ together with the nitrogen atom to which they are attached represent a 4-alkyl-1-piperazinyl group, and especially those such compounds wherein both symbols X represent the same atom or group.

The present invention also includes within its scope fungicidal, insecticidal, acaricidal and herbicidal compositions which contain, as the active ingredient, at least one boron derivative of general formula I in association with one or more diluents or adjuvants compatible with the boron compound(s) and suitable for use in agriculture. Preferably the compositions contain between 50 and 0.005 percent by weight of boron compound.

The compositions may be solid if there is employed a powdered solid compatible diluent such as talc, calcined magnesia, kieselguhr, tricalcium phosphate, powdered cork, absorbent charcoal, or a clay such as kaolin or bentonite. These solid compositions are preferably prepared by grinding the boron compound with the solid diluent, or by impregnating the solid diluent with a solution of the boron compound in a volatile solvent, evaporating the solvent, and if necessary grinding the product so as to obtain a powder.

Instead of a solid diluent, there may also be used a liquid in which the boron compound is dissolved or dispersed. The compositions may thus take the form of suspensions, emulsions or solutions in organic or aqueous-organic media, for example acetophenone, aromatic hydrocarbons such as toluene or xylene, or mineral, animal or vegetable oils, or mixtures of these diluents. The compositions in the form of suspensions, emulsions or solutions may contain wetting, dispersing or emulsifying agents of the ionic or non-ionic type, for example sulphoricinoleates, quaternary ammonium derivatives or products based on ethylene oxide condensates, such as condensates of ethylene oxide with octylphenol, or fatty acid esters of anhydrosorbitols which have been rendered soluble by etherification of the free hydroxyl radicals by condensation with ethylene oxide. It is preferable to use agents of the non-ionic type because they are not sensitive to electrolytes. When emulsions are required, the boron compounds may be used in the form of self-emulsifying concentrates containing the active substance dissolved in the emulsifying agent or in a solvent containing an emulsifying agent compatible with the boron compound and solvent, a simple addition of water to such concentrates producing compositions ready for use.

These compositions, which can be solid or liquid, optionally contain other fungicides, insecticides, acaricides and/or herbicides compatible with the boron compounds of general formula I. By way of example, suitable insecticides are phosphorus-containing derivatives such as parathion or phosalone; suitable fungicides are organic compounds such as maneb or benomyl; suitable herbicides are triazines such as simazine, ureas such as monurone, or phenoxyacetic acid derivatives such as 2,4-dichlorophenoxyacetic acid.

The new boron derivatives of general formula I are preferably employed as pesticides or herbicides in a quantity of 50 to 100 g. of active substance per hectoliter of water and generally, depending on the species of pest or weed, the type of infestation and the degree of infestation, an amount of between 500 and 3000 liters of such aqueous compositions per hectare is necessary.

The following Examples illustrate the invention.

EXAMPLE 1

A solution of diphenylchloroborane (29 g.) in anhydrous diethyl ether (30 cc.) is added over a period of 15 minutes to a solution of Grignard reagent prepared from magnesium (3.96 g.) and 1-chloro-3-dimethylaminopropane (20 g.) in tetrahydrofuran (35 cc.) at 25° C. The reaction mixture is refluxed for 1 hour and, after evaporation of the solvents under reduced pressure (20 mm.Hg), the residue is dissolved in chloroform (200 cc.) and then treated with a 30 percent (w/v) aqueous solution of ammonium chloride (150 cc.). The chloroform layer is decanted and the aqueous phase is extracted twice with chloroform (total 100 cc.). The chloroform solution is washed twice with water (total 100 cc.), dried over anhydrous sodium sulphate and then evaporated under reduced pressure (20 mm.Hg). Recrystallization of the resulting crude product from ethanol (700 cc.) yields 1,1-dimethyl-2,2-diphenyl-1,2-azaborolidine (20 g.) melting at 156° C.

Diphenylchloroborane employed as starting material can be prepared according to J. Soulie and P. Cadiot, Bull. Soc. Chim. p. 1981 (1966).

EXAMPLE 2

A solution of butyl diphenylborinate (10.8 g.) in tetrahydrofuran (10 cc.) is added over a period of 10 minutes to a solution of a Grignard reagent prepared from magnesium (1.55 g.) and 1-chloro-3-dimethylaminopropane (7.8 g.) in tetrahydrofuran (30 cc.) at 30° C. The reaction mixture is left for one hour at 20° C. and is then hydrolysed with a 30 percent (w/v) aqueous solution of ammonium chloride (40 cc.).

After evaporation of the tetrahydrofuran under reduced pressure (20 mm.Hg), the product is extracted four times with benzene (total 400 cc.). The benzene solutions are combined, washed three times with distilled water (total 150 cc.) and dried over anhydrous sodium sulphate. The residual oil is crystallized from ethanol (20 cc.) to give 1,1-dimethyl-2,2-diphenyl-1,2-azaborolidine (1.22 g.) melting at 156° C.

Butyl diphenylborinate employed as starting material can be prepared according to the method of R.L. Letsinger and I. Skoog, J. Am. Chem. Soc., 77, 2491 (1955).

EXAMPLE 3

A solution of 2,2-diphenyl-3,3-dimethyl-1,3,2-oxazaborolidine (8.4 g.) in tetrahydrofuran (80 cc.) is added over a period of 13 minutes to a solution of a Grignard reagent prepared from magnesium (2.64 g.) and 1-chloro-3-dimethylaminopropane (12.1 g.) in tetrahydrofuran (30 cc.) at 30° C. The reaction mixture is refluxed for 1 hour and, after evaporation of the solvent under reduced pressure (20 mm.Hg), the residue is dissolved in chloroform (100 cc.) and is then hydrolysed with a 30 percent (w/v) aqueous solution of ammonium chloride (100 cc.). The chloroform layer is decanted and the aqueous phase is extracted twice with chloroform (total 150 cc.). The combined chloroform solutions are dried over anhydrous sodium sulphate and then evaporated under reduced pressure (20 mm.Hg). The residue is crystallized from ethanol (20 cc.) to give 1,1-dimethyl-2,2-diphenyl-1,2-azaborolidine (2.6 g.) melting at 156° C.

2,2-Diphenyl-3,3-dimethyl-1,3,2-oxazaborolidine employed as starting material can be prepared according to H. Weidmann and H.K. Zimmerman, Ann., *619*, 28 (1958).

EXAMPLE 4

A solution of diphenylchloroborane (17 g.) in anhydrous diethyl ether (30 cc.) is added over a period of 10 minutes to a solution of a Grignard reagent prepared from magnesium (2.64 g.) and 1-chloro-3-dimethylamino-2-methylpropane (13.5 g.) in tetrahydrofuran (30 cc.) at 25°C. The reaction mixture is refluxed for 1 hour and, after evaporation of the solvents under reduced pressure (20 mm.Hg), the residue is dissolved in chloroform (200 cc.) and then hydrolysed with a 30 percent (w/v) aqueous solution of ammonium chloride (100 cc.). The chloroform layer is decanted and the aqueous phase is extracted twice with chloroform (total 100 cc.). The chloroform solution is washed three times with distilled water (total 150 cc.), dried over anhydrous sodium sulphate and then evaporated under reduced pressure (20 mm.Hg). After recrystallization of the resulting crude product from acetonitrile (150 cc.), 1,1,4-trimethyl-2,2-diphenyl-1,2-azaborolidine (15.3 g.), melting at 165° C., is obtained.

EXAMPLE 5

A solution of diphenylchloroborane (22.5 g.) in anhydrous diethyl ether (50 cc.) is added over a period of 13 minutes to a solution of a Grignard reagent prepared from magnesium (3.3 g.) and 1-(3-chloropropyl)-4-methylpiperazine (20 g.) in tetrahydrofuran (60 cc.) at 60° C. The reaction mixture is left for 4 hours 30 minutes at a temperature of about 20° C. The residue obtained after concentration of the reaction mixture under reduced pressure (20 mm.Hg) is dissolved in chloroform (200 cc.) and then treated with a 30 percent (w/v) aqueous solution of ammonium chloride (200 cc.). The chloroform layer is decanted, washed twice with water (total 100 cc.), dried over anhydrous sodium sulphate and then concentrated under reduced pressure (20 mm.Hg). The resulting oil (30.7 g.) is taken up in N hydrochloric acid (250 cc.) and extracted three times with diethyl ether (total 100 cc.). The aqueous phase is rendered alkaline by addition of 5N sodium hydroxide solution until a pH of 10 is reached, and is then extracted three times with benzene (100 cc.) and dried over anhydrous sodium sulphate. After concentration under reduced pressure (20 mm.Hg), the residue is solidified by trituration in diisopropyl ether (50 cc.). Recrystallization from isopropanol (225 cc.) yields 1,1-diphenyl-8-methyl-1-boro-5-azonia-8-azaspiro[4,5]decane (6.3 g.) melting at 176° C.

EXAMPLE 6

Bis(4-fluorophenyl)chloroborane (23.6 g.) dissolved in anhydrous diethyl ether (30 cc.) is added over a period of 22 minutes to a solution of a Grignard reagent prepared from magnesium (3.65 g.) and 1-chloro-3-dimethylaminopropane (18.2 g.) in tetrahydrofuran (30 cc.). The reaction mixture is refluxed for 5 hours and is then kept for 16 hours at a temperature of about 20° C. The residue obtained after concentration under reduced pressure (20 mm.Hg) is dissolved in chloroform (200 cc.). The solution thus obtained is treated with a 30 percent (w/v) aqueous solution of ammonium chloride (110 cc.). The chloroform layer is decanted, washed twice with water (total 100 cc.) and dried over anhydrous sodium sulphate. After concentration under reduced pressure (20 mm.Hg) and recrystallization of the residue from ethanol (35 cc.), 1,1-dimethyl-2,2-bis(4-fluorophenyl)-1,2-azaborolidine (18.5 g.), melting at 118° C., is obtained.

Bis(4-fluorophenyl)chloroborane employed as starting material can be prepared as follows:

Butyl bis(4-fluorophenyl)borinate (47 g.) and phosphorus pentachloride (35.7 g.) are heated at 100° C. until a solution is obtained. After evaporation of the volatile products under reduced pressure (20 mm.Hg) at 90° C., the residual oil is distilled under reduced pressure to give bis(4-fluorophenyl)chloroborane (39 g.) distilling at 108° C./0.4 mm.Hg.

Butyl bis(4-fluorophenyl) borinate can be prepared by esterifying bis(4-fluorophenyl)borinic acid (71 g.) with butanol (400 cc.), the reaction being carried out in toluene (1 liter) and the water formed being removed by azeotropic distillation. Distillation under reduced pressure yields butyl bis(4-fluorophenyl)borinate (85 g.), b.p. 138° C./0.4 mm.Hg.

Bis(4-fluorophenyl)borinic acid can be prepared by hydrochloric acid hydrolysis of its aminoethyl ester, which can be prepared according to U.S. Pat. No. 3,117,854.

EXAMPLE 7

Bis(3-chlorophenyl)chloroborane (22 g.) dissolved in anhydrous diethyl ether (50 cc.) is added over a period of 15 minutes, while cooling by means of a water bath, to a solution of a Grignard reagent prepared from magnesium (2.5 g.) and 1-chloro-3-dimethylaminopropane (12.4 g.) in tetrahydrofuran (30 cc.). After 16 hours at about 25° C., the solvents are evaporated under reduced pressure (20 mm.Hg.) and the resulting residue is dissolved in chloroform (200 cc.). The chloroform solution is treated with a 30 percent (w/v) aqueous solution of ammonium chloride (100 cc.), decanted, washed three times with water (100 cc.) and dried over anhydrous sodium sulphate. The residue obtained after concentration of the solvents under reduced pressure (20 mm.Hg) is recrystallized from propanol (250 cc.) to give 1,1-dimethyl-2,2-bis(3-chlorophenyl)-1,2-azaborolidine (14.3 g.) melting at 121° C.

Bis(3-chlorophenyl)chloroborane employed as starting material can be prepared as follows:

Butyl bis(3-chlorophenyl)borinate (71 g.) and phosphorus pentachloride (50 g.) are heated at 100° C. with stirring until a solution is obtained. After concentration of the solution under reduced pressure (20 mm.Hg) at 90° C., the residual oil is distilled to give bis(3-chlorophenyl)chloroborane (46.5 g.), b.p. 173°–179° C./0.1 mm.Hg.

Butyl bis(3-chlorophenyl)borinate can be prepared by esterification of bis(3-chlorophenyl)boronic acid (68 g.) with butanol (288 cc.), the reaction being carried out in toluene (1140 cc.) and the water formed being removed by azeotropic distillation. Distillation under reduced pressure yields butyl bis(3-chlorophenyl)borinate (71 g.), b.p. 167° C./0.4 mm.Hg.

Bis(3-chlorophenyl)borinic acid can be prepared by hydrochloric acid hydrolysis of its aminoethyl ester or 2,2-bis(3-chlorophenyl)-1,3,2-oxazaborolidine (m.p. 142° C.) which can be prepared according to the method of Y. Rasiel and H.K. Zimmerman Jr., Ann., 649, 111 (1961).

EXAMPLE 8

Bis(4-chlorophenyl)chloroborane (22 g.) dissolved in anhydrous diethyl ether (50 cc.) is added over a period of 16 minutes, while cooling by means of a water bath, to a solution of a Grignard reagent prepared from magnesium (2.5 g.) and 1-chloro-3-dimethylaminopropane (12.4 g.) in tetrahydrofuran (30 cc.). After 16 hours at a temperature of about 20° C., the solvents are evaporated under reduced pressure (20 mm.Hg) and the resulting residue is dissolved in chloroform (200 cc.). The chloroform solution is treated with a 30 percent (w/v) aqueous solution of ammonium chloride (100 cc.), decanted, washed three times with water (total 150 cc.) and then dried over anhydrous sodium sulphate. After concentration by removal of the solvents under reduced pressure (20 mm.Hg), the resulting residue is successively recrystallized from isopropanol (75 cc.) and then from ethanol (50 cc.) to give 1,1-dimethyl-2,2-bis-(4-chlorophenyl)-1,2-azaborolidine (10 g.) melting at 107° C.

Bis(4-chlorophenyl)chloroborane (47 g.) employed as starting material (b.p. 160°–170° C./0.5 mm.Hg) can be prepared by reaction of phosphorus pentachloride (53 g.) with butyl bis(4-chlorophenyl)borinate (78 g.).

Butyl bis(4-chlorophenyl)borinate (b.p. 170° C./0.2 mm.Hg) can be prepared according to the method described by Hawthorne, J. Am. Chem. Soc., 80, 4295 (1958).

EXAMPLE 9

A solution of 3-dimethylaminopropylmagnesium chloride in tetrahydrofuran (100 cc.: 1.46 mole/liter) is added over a period of 40 minutes to a solution of butyl bis(4-chlorophenyl)borinate (50 g.) in tetrahydrofuran (270 cc.) at 20° C. After 16 hours at a temperature of about 20° C., the solvents are evaporated under reduced pressure (20 mm.Hg) and the resulting residue is dissolved in chloroform (300 cc.). The chloroform solution is then hydrolysed with hydrochloric acid (163 cc.) and the organic phase is decanted, washed with water (150 cc.) and dried over anhydrous sodium sulphate. After evaporation of the chloroform under reduced pressure (20 mm.Hg), the resulting residue is recrystallized from ethanol (65 cc.) to give 1,1-dimethyl-2,2-bis(4-chlorophenyl)-1,2-azaborolidine (32 g.) melting at 107° C.

EXAMPLE 10

A solution of 3-dimethylaminopropylmagnesium chloride in tetrahydrofuran (49 cc.: 1.74 mole/liter) is added over a period of 8 minutes to a suspension of 2,2-bis-(4-methoxyphenyl)-1,3,2-oxazaborolidine (6.9 g.) in anhydrous diethyl ether (40 cc.) at 15° C. The reaction mixture is then heated under reflux for 16 hours. The resulting yellow solution is hydrolysed with a 20 percent (w/v) aqueous solution of ammonium chloride (40 cc.). The organic layer is separated by decantation and washed twice with water (total 30 cc.) and dried over anhydrous sodium sulphate. The residue obtained after concentration under reduced pressure (20 mm.Hg) is recrystallized from isopropanol (15 cc.) to give 1,1-dimethyl-2,2-bis(4-methoxyphenyl)-1,2-azaborolidine (5.3 g.) melting at 107° C.

2,2-Bis(4-methoxyphenyl)-1,3,2-oxazaborolidine (m.p. 185° C.) employed as starting material can be prepared according to the method described by Y. Rasiel and H.K. Zimmerman Jr., Ann., 649, 111 (1961).

EXAMPLE 11

A solution of a Grignard reagent prepared from magnesium (7.2 g.) and 1-chloro-3-dimethylaminopropane (36.2 g.) in tetrahydrofuran (120 cc.) is added over a period of 20 minutes to a suspension of 2,2-bis(4-methylthiophenyl)-1,3,2-oxazaborolidine (30 g.) in anhydrous diethyl ether (50 cc.). The reaction mixture is heated under reflux for 16 hours. The yellow solution obtained is hydrolysed with a 20 percent (w/v) aqueous solution of ammonium chloride (150 cc.). The organic layer is decanted, washed four times with water (total 200 cc.) and dried over anhydrous sodium sulphate. After concentration under reduced pressure (20 mm.Hg), the residue obtained is solidified by trituration in acetonitrile (20 cc.) and is then twice recrystallized from acetonitrile (25 cc.) and then from ethanol (75 cc.). 1,1-Dimethyl-2,2-bis(4-methylthiophenyl)-1,2-azaborolidine (4.5 g.), melting at 103° C., is thus obtained.

2,2-Bis(4-methylthiophenyl)-1,3,2-oxazaborolidine (m.p. 192°–195° C.) employed as starting material can be prepared according to the method described by Y. Rasiel and H.K. Zimmerman Jr., Ann, 649, 111 (1961).

EXAMPLE 12

A solution of a Grignard reagent prepared from magnesium (11.6 g.) and 1-chloro-3-dimethylaminopropane (45 g.) in tetrahydrofuran (200 cc.) is added to a suspension of 2,2-bis(4-methylphenyl)-1,3,2-oxazaborolidine (27.8 g.) in anhydrous diethyl ether (200 cc.). The reaction mixture is heated under reflux for 16 hours. After cooling, the resulting solution is hydrolysed with a 10 percent (w/v) aqueous solution of ammonium chloride (200 cc.). The organic layer is decanted, washed four times with water (250 cc.) and then dried over anhydrous sodium sulphate. After concentration under reduced pressure (20 mm.Hg), the resulting residue is solidified by triturating in methanol (25 cc.). After recrystallization from hexane (30 cc.), 1,1-dimethyl-2,2-bis(4-methylphenyl)-1,2-azaborolidine (9.4 g.), melting at 106° C., is obtained.

2,2-Bis(4-methylphenyl)-1,3,2-oxazaborolidine (m.p. 205° C.) employed as starting material can be prepared according to Y. Rasiel and H.K. Zimmerman Jr., Ann., 649, 111 (1961).

EXAMPLE 13

A solution of 3-dimethylaminopropylmagnesium chloride in tetrahydrofuran (55 cc.: 1.58 mole/liter) is added over a period of 35 minutes to a solution of butyl bis(4-methylphenyl)borinate (23 g.) in tetrahydrofuran (125 cc.) at −10° C. The reaction mixture is maintained at that temperature for 1 hour and then at about 25° C. for 16 hours. After concentration under reduced pressure (20 mm.Hg), the residue obtained is taken up in chloroform (200 cc.) and hydrolysed with N hydrochloric acid (43 cc.). After decantation, the organic layer is washed twice with water (200 cc.) and then dried over anhydrous sodium sulphate. After concentration under reduced pressure (20 mm.Hg), the resulting crude product is recrystallized from isopropanol (10 cc.) to give 1,1-dimethyl-2,2-bis(4-methylphenyl)-1,2-azaborolidine (7.8 g.) melting at 106° C.

Butyl bis(4-methylphenyl)borinate (b.p. 160° C./0.2 mm.Hg) employed as starting material can be obtained according to Hawthorne, J. Am. Chem. Soc., 80, 4295 (1958).

EXAMPLE 14

A solution of 3-dimethylaminopropylmagnesium chloride in tetrahydrofuran (28.8 cc.: 1.58 mole/liter) is added over a period of 15 minutes to a solution of 3,3-dimethyl-2,2-bis(4-methylphenyl)-1,3,2-oxazaborolidine (12.7 g.) in tetrahydrofuran (125 cc.) at 25° C. After 16 hours at about 25° C., the tetrahydrofuran is evaporated under reduced pressure (20 mm.Hg). The resulting residue is taken up in chloroform (125 cc.) and hydrolysed with a 20 percent (w/v) aqueous solution of ammonium chloride (12.2 cc.). After decantation, the chloroform layer is washed six times with water (100 cc.) and then dried over anhydrous sodium sulphate. The residue obtained after concentration under reduced pressure (20 mm.Hg) is recrystallized from isopropanol (10 cc.) to give 1,1-dimethyl-2,2-bis(4-methylphenyl)-1,2-azaborolidine (6.7 g.) melting at 106° C.

3,3-Dimethyl-2,2-bis(4-methylphenyl)-1,3,2-oxazaborolidine (m.p. 136° C.) can be prepared according to the method of Y. Rasiel and H.K. Zimmerman Jr., Ann. 649, 111 (1961).

EXAMPLE 15

A solution of 3-dimethylaminopropylmagnesium chloride in tetrahydrofuran (33.3 cc.: 1.79 mole/liter) at is added to a solution of bis(2-chlorophenyl)chloroborane (16 g.) in tetrahydrofuran (50 cc.) at 45° C. After 16 hours at a temperature of about 20° C., the solution is concentrated under reduced pressure (20 mm.Hg). The residue obtained is dissolved in chloroform (100 cc.) and the resulting solution is hydrolysed with a 30 percent (w/v) aqueous solution of ammonium chloride (70 cc.). After decantation, the organic phase is washed twice with water (total 100 cc.) and is then dried over anhydrous sodium sulphate. The residue obtained after concentration under reduced pressure (20 mm.Hg) is recrystallized from ethanol (20 cc.) to give 1,1-dimethyl-2,2-bis(2-chlorophenyl)-1,2-azaborolidine (5 g.) melting at 139° C.

Bis(2-chlorophenyl)chloroborane (16 g.), b.p. 142° C./0.2 mm.Hg, employed as starting material can be prepared by reaction of phosphorus pentachloride (17 g.) with butyl bis(2-chlorophenyl)borinate (24.1 g.).

Butyl bis(2-chlorophenyl)borinate (b.p. 164° C./0.4 mm.Hg) can be prepared according to the method of Ai-Tse Po, Chia-Hsing Pan and Cheng-Heng Kao, Hua Hsueh Hsueh Pao, 30, 79–82(1964); Chem. Abst. 61, a (1964).

EXAMPLE 16

A solution of 3-dibutylaminopropylmagnesium chloride in tetrahydrofuran (49 cc.: 0.8 mole/liter) is added to a solution of bis(4-methylphenyl)chloroborane (9 g.) in tetrahydrofuran (100 cc.). After 16 hours at a temperature of about 20° C., the tetrahydrofuran is evaporated under reduced pressure (20 mm.Hg). The residue obtained is taken up in chloroform (100 cc.) and the solution is then hydrolysed with a 10 percent (w/v) aqueous solution of ammonium chloride (100 cc.). After decantation, the organic layer is washed three times with water (150 cc.) and then dried over anhydrous sodium sulphate. The residue obtained after concentration under reduced pressure (20 mm.Hg) is solidified by trituration in methanol (15 cc.). After filtration and then recrystallization from methanol (135 cc.), 1,1-dibutyl-2,2-bis(4-methylphenyl)-1,2-azaborolidine (2.2 g.), melting at about 84° C., is obtained.

Bis(4-methylphenyl)chloroborane (b.p. 140° C./0.1 mm.Hg) employed as starting material can be prepared according to P.I. Paetzold, P.P. Habederer and R. Muellbauer, J. Organometal. Chem., 7, 45–90 (1967).

EXAMPLE 17

A condensation product of octylphenol and ethylene oxide containing 10 moles of ethylene oxide per mole of octylphenol (10 parts by weight) is added to a solution of 1,1-dimethyl-2,2-bis(4-chlorophenyl)-1,2-azaborolidine (25 parts by weight) in a mixture of equal parts (by volume) of toluene and acetophenone (65 parts by volume). The resulting solution is used, after dilution with water, in the ratio of 200 cc. of this solution per 100 liters of water.

EXAMPLE 18

A condensation product of octylphenol and ethylene oxide containing 10 moles of ethylene oxide per mole of octylphenol (10 parts by weight) is added to a solution of 1,1-dimethyl-2,2-bis(4-methylphenyl)-1,2-azaborolidine (25 parts by weight) in a mixture of equal parts (by volume) of toluene and acetophenone (65 parts by volume). The resulting solution is used, after dilution with water, in the ratio of 200 cc. of this solution per 100 liters of water.

EXAMPLE 19

A condensation product of octylphenol and ethylene oxide containing 10 moles of ethylene oxide per mole of octylphenol (10 parts by weight) is added to a solution of 1,1-dimethyl-2,2-diphenyl-1,2-azaborolidine (25 parts by weight) in a mixture of equal parts (by volume) of toluene and acetophenone (65 parts by volume). The resulting solution is used, after dilution with water, in the ratio of 200 cc. of this solution per 100 liters of water.

We claim:

1. An azaborolidine of the formula:
0025

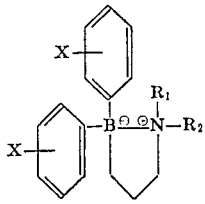

wherein $R_1$ and $R_2$ each represent alkyl of one through four carbon atoms, or $R_1$ and $R_2$ together with the nitrogen atom to which they are attached collectively represent 1-pyrrolidinyl, piperidino, morpholino or 4-alkyl-1-piperazinyl with one through four carbon atoms in the alkyl radical, X represents hydrogen, halogen, alkyl, alkoxy or alkylthio of one through four carbon atoms, trifluoromethyl or dimethylsulphamoyl, and at least one of the carbon atoms of the trimethylene chain linking the nitrogen and boron atoms in the azaborolidine ring can be substituted by alkyl of one through four carbon atoms.

2. An azaborolidine according to claim 1 wherein X represents hydrogen, halogen, or alkyl, alkoxy or alkylthio of one through four carbon atoms.

3. An azaborolidine according to claim 1 wherein both symbols X represent the same atom or group.

4. The azaborolidine according to claim 1 which is 1,1-dimethyl-2,2-diphenyl-1,2-azaborolidine.

5. The azaborolidine according to claim 1 which is 1,1-dimethyl-2,2-bis(4-fluorophenyl)-1,2-azaborolidine.

6. The azaborolidine according to claim 1 which is 1,1-dimethyl-2,2-bis(3-chlorophenyl)-1,2-azaborolidine.

7. The azaborolidine according to claim 1 which is 1,1-dimethyl-2,2-bis(4-chlorophenyl)-1,2-azaborolidine.

8. The azaborolidine according to claim 1 which is 1,1-dimethyl-2,2-bis(4-methoxyphenyl)-1,2-azaborolidine.

9. The azaborolidine according to claim 1 which is 1,1-dimethyl-2,2-bis(4-methylthiophenyl)-1,2-azaborolidine.

10. The azaborolidine according to claim 1 which is 1,1-dimethyl-2,2-bis(4-methylphenyl)-1,2-azaborolidine.

11. The azaborolidine according to claim 1 which is 1,1-dimethyl-2,2-bis(2-chlorophenyl)-1,2-azaborolidine.

12. The azaborolidine according to claim 1 which is 1,1,4-trimethyl-2,2-diphenyl-1,2-azaborolidine.

13. The azaborolidine according to claim 1 which is 1,1-dibutyl-2,2-bis(4-methylphenyl)-1,2-azaborolidine.

14. The azaborolidine according to claim 1 which is 1,1-diphenyl-8-methyl-1-boro-5-azonia-8-azaspiro-[4,5]decane.

15. An azaborolidine according to claim 1 wherein $R_1$ and $R_2$ each represent alkyl of one through four carbon atoms.

16. An azabrolidine according to claim 1 wherein $R_1$ and $R_2$ represent methyl.

* * * * *